United States Patent
Roitman et al.

(10) Patent No.: US 11,327,982 B1
(45) Date of Patent: May 10, 2022

(54) COLUMN-BASED QUERY EXPANSION FOR TABLE RETRIEVAL

(71) Applicant: International Business Machines Corporation, Armonk, NY (US)

(72) Inventors: Haggai Roitman, Yoknea'm Elit (IL); Guy Feigenblat, Givataym (IL); Roee Shraga, Haifa (IL); Bar Weiner, Kibbutz Yad Mordechai (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/070,953

(22) Filed: Oct. 15, 2020

(51) Int. Cl.
*G06F 16/2457* (2019.01)
*G06F 16/22* (2019.01)
*G06F 16/242* (2019.01)

(52) U.S. Cl.
CPC ...... *G06F 16/24578* (2019.01); *G06F 16/221* (2019.01); *G06F 16/2282* (2019.01); *G06F 16/2423* (2019.01)

(58) Field of Classification Search
CPC .......... G06F 16/2282; G06F 16/24578; G06F 16/338
USPC .................................................. 707/713, 723
See application file for complete search history.

(56) References Cited

U.S. PATENT DOCUMENTS

| | | | |
|---|---|---|---|
| 8,538,896 B2 | 9/2013 | Mensink | |
| 2009/0254514 A1* | 10/2009 | Adair | G06F 16/24534 |
| 2012/0011115 A1* | 1/2012 | Madhavan | G06F 16/951 |
| | | | 707/723 |
| 2012/0254076 A1* | 10/2012 | Yang | G06F 16/5866 |
| | | | 706/12 |
| 2012/0310928 A1* | 12/2012 | Ray | G06F 16/90335 |
| | | | 707/728 |

OTHER PUBLICATIONS

Jon M. Kleinberg, "Authoritative Sources in a Hyperlinked Environment," Journal of the ACM, vol. 46, No. 5 (1999) 604-632.

(Continued)

*Primary Examiner* — Robert W Beausoliel, Jr.
*Assistant Examiner* — Pedro J Santos
(74) *Attorney, Agent, or Firm* — Dvir Gassner

(57) ABSTRACT

In a computerized information retrieval system: executing a search based on a query, to retrieve a set of tables ranked according to their relevancy to the query, wherein each of the tables includes one or more columns; selecting, from the retrieved tables, a predefined number of highest-ranking tables; scoring each column in the highest-ranking tables using a link analysis algorithm, and selecting, from the scored columns, a predefined number of highest-scoring columns; scoring terms contained within each of the highest-scoring columns, and selecting, from the scored terms, a predefined number of highest-scoring terms; re-ranking the highest-ranking tables by using the highest-scoring terms as pseudo relevance feedback that expands the query; and providing, as a response to the query, at least one of: the re-ranked tables, ordered according to the re-ranking, and data contained in at least one of the re-ranked tables, wherein the data are ordered according to the re-ranking.

6 Claims, 2 Drawing Sheets

(56) References Cited

OTHER PUBLICATIONS

Li Zhang, Shuo Zhang, and Krisztian Balog, "Table2Vec: Neural Word and Entity Embeddings for Table Population and Retrieval," SIGIR'19: Proceedings of the 42nd International ACM SIGIR Conference on Research and Development in Information Retrieval (2019) 1029-1032.

Michael J. Cafarella, Alon Halevy, Zhe Daisy Wang, Eugene Wu, Yang Zhang, "WebTables: Exploring the Power of Tables on the Web," Proceedings of the VLDB Endowment (2008).

Rakesh Pimplikar, Sunita Sarawagi, "Answering Table Queries on the Web using Column Keywords," Proceedings of the VLDB Endowment, vol. 5, No. 10 (2012).

Roee Shraga, Haggai Roitman, Guy Feigenblat, Bar Weiner, "Projection-Based Relevance Model for Table Retrieval", WWW'20: Companion Proceedings of the Web Conference (2020) 28-29.

Roee Shraga, Haggai Roitman, Guy Feigenblat, Mustafa Canim, "Ad Hoc Table Retrieval using Intrinsic and Extrinsic Similarities," WWW'20: Proceedings of The Web Conference (2020) 2479-2485.

Shuo Zhang and Krisztian Balog, "Ad Hoc Table Retrieval Using Semantic Similarity," WWW'18: Proceedings of the 2018 World Wide Web Conference (2018) 1553-1562.

Shuo Zhang, Krisztian Balog, "On-the-fly Table Generation," SIGIR '18: The 41st International ACM SIGIR Conference on Research & Development in Information Retrieval (2018) 595-604.

Victor Lavrenko, W. Bruce Croft, "Relevance-Based Language Models," SIGIR '01: Proceedings of the 24th Annual International ACM SIGIR conference on Research and Development in Information Retrieval (2001) 120-127.

Zhao Yan, Duyu Tang, Nan Duan, Junwei Bao, Yuanhua Lv, Ming Zhou, Zhoujun Li, "Content-based table retrieval for web queries," arXiv:1706.02427v1 [cs.CL] Jun. 8, 2017.

* cited by examiner

COLUMN-BASED QUERY EXPANSION FOR TABLE RETRIEVAL

BACKGROUND

The invention relates to the field of computerized information retrieval.

Information retrieval systems typically operate by receiving a query and searching for pertinent information in a corpus of electronic data—be it text, images, audio, video, or any other type of data. For example, Web search engines receive user queries and search for relevant information in a centralized index of the World Wide Web, maintained by each search engine. Similarly, organizational information retrieval systems conduct searches in an index of the organization's internal collection of electronic documents and other data.

To improve the relevancy of retrieved information, many information retrieval systems invoke a task called "query expansion" before returning search results. While some query expansion techniques directly improve the query, such as by correcting spelling errors and adding synonyms, others perform more complex computations in order to enhance the relevancy of the retrieved information to the query. Of the latter, a technique called "pseudo relevance feedback" (or sometimes "blind relevance feedback") executes an initial search with the original query, retrieves a ranked list of documents, assumes that the top-k ranked documents are generally relevant, and re-ranks these top-k documents based on some logic that is believed to better suit the user's information needs.

A specific task within the rich realm of information retrieval is table retrieval. Data contained in tables is often of high quality, and enabling information retrieval systems to effectively search such tabular data is of great benefit. In many scenarios, a user's information needs can be better satisfied by retrieving information contained in tables than by retrieving information contained in unstructured text documents. One of the fundamental types of table retrieval, termed "ad-hoc table retrieval," involves, for a given query in natural language, returning a ranked list of the most relevant tables found in the pertinent corpus.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a method comprising, in a computerized information retrieval system, the following automatic steps: receiving a query; executing a search based on the query, to retrieve a set of tables ranked according to their relevancy to the query, wherein each of the tables includes one or more columns; selecting, from the set of tables, a predefined number of highest-ranking tables; scoring each column in the highest-ranking tables using a link analysis algorithm, and selecting, from the scored columns, a predefined number of highest-scoring columns; scoring terms contained within each of the highest-scoring columns, and selecting, from the scored terms, a predefined number of highest-scoring terms; re-ranking the highest-ranking tables by using the highest-scoring terms as pseudo relevance feedback that expands the query; and providing, as a response to the query, at least one of: (a) the re-ranked tables, ordered according to the re-ranking, and (b) data contained in at least one of the re-ranked tables, wherein the data are ordered according to the re-ranking.

Another embodiment relates to a system comprising: at least one hardware processor, and a non-transitory computer-readable storage medium having program code embodied therewith, the program code executable by said at least one hardware processor to, automatically: receive a query; execute a search based on the query, to retrieve a set of tables ranked according to their relevancy to the query, wherein each of the tables includes one or more columns; select, from the set of tables, a predefined number of highest-ranking tables; score each column in the highest-ranking tables using a link analysis algorithm, and select, from the scored columns, a predefined number of highest-scoring columns; score terms contained within each of the highest-scoring columns, and select, from the scored terms, a predefined number of highest-scoring terms; re-rank the highest-ranking tables by using the highest-scoring terms as pseudo relevance feedback that expands the query; and provide, as a response to the query, at least one of: (i) the re-ranked tables, ordered according to the re-ranking, and (ii) data contained in at least one of the re-ranked tables, wherein the data are ordered according to the re-ranking.

A further embodiment relates to a computer program product comprising a non-transitory computer-readable storage medium having program code embodied therewith, the program code executable by at least one hardware processor to, automatically: receive a query; execute a search based on the query, to retrieve a set of tables ranked according to their relevancy to the query, wherein each of the tables includes one or more columns; select, from the set of tables, a predefined number of highest-ranking tables; score each column in the highest-ranking tables using a link analysis algorithm, and select, from the scored columns, a predefined number of highest-scoring columns; score terms contained within each of the highest-scoring columns, and select, from the scored terms, a predefined number of highest-scoring terms; re-rank the highest-ranking tables by using the highest-scoring terms as pseudo relevance feedback that expands the query; and provide, as a response to the query, at least one of: (a) the re-ranked tables, ordered according to the re-ranking, and (b) data contained in at least one of the re-ranked tables, wherein the data are ordered according to the re-ranking.

In some embodiments, the method further comprises, or the program code is further executable for: calculating content similarity between each of the highest-ranking tables and each of the columns of the highest-ranking tables, wherein the calculated content similarities are factored in the scoring of the columns of the highest-ranking tables.

In some embodiments, the link analysis algorithm is the Hyperlink-Induced Topic Search (HITS) algorithm; and in the scoring of the columns of the highest-ranking tables: the highest-ranking tables are represented as hubs, the columns of the highest-ranking tables are represented as authorities, hub weights and authority weights are iteratively updated while factoring in the calculated content similarities, and the scoring of the columns of the highest-ranking tables is based on the authority weights upon convergence of the HITS algorithm.

In some embodiments, the content similarity is calculated using a technique selected from the group consisting of: Bhattacharyya coefficient; Term Frequency-Inverse Document Frequency (TF-IDF); Pointwise Mutual Information (PMI); and Kullback-Leibler divergence.

In some embodiments, the scoring of the terms comprises scoring each of the terms according to its similarity to the query.

In some embodiments, the similarity of each of the terms to the query is evaluated using a technique selected from the group consisting of: Bhattacharyya coefficient; Term Frequency-Inverse Document Frequency (TF-IDF); Pointwise Mutual Information (PMI); and Kullback-Leibler divergence.

In some embodiments, the re-ranking is based on: cross-entropy between each of at least some of the terms and each of the highest-ranking tables; and cross-entropy between each of at least some of the terms and the query.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a technique, embodied in a system, method, and computer program product, for automatic query expansion in table retrieval (sometimes referred to as "ad-hoc" table retrieval) performed by an information retrieval system. Advantageously, the technique leverages data contained in table columns to enhance relevancy of the retrieved tables.

Given a query, the present technique may first retrieve a ranked list of the most relevant tables in a certain table corpus. Then, columns in the highest-ranking tables may be scored using a link analysis algorithm, considering content similarity between each column and each of the highest-ranking tables. Next, terms contained within the highest-scoring columns may be scored, for example based on their similarity to the query. The highest-ranking tables may then be re-ranked by using the highest-scoring terms as pseudo relevance feedback that expands the query, based on the assumption that these terms are strongly associated with the information needs of the querying user. Finally, the re-ranked tables or some of their data, all ordered according to the re-ranking, are provided to the user as a response to the query.

Figure 1:
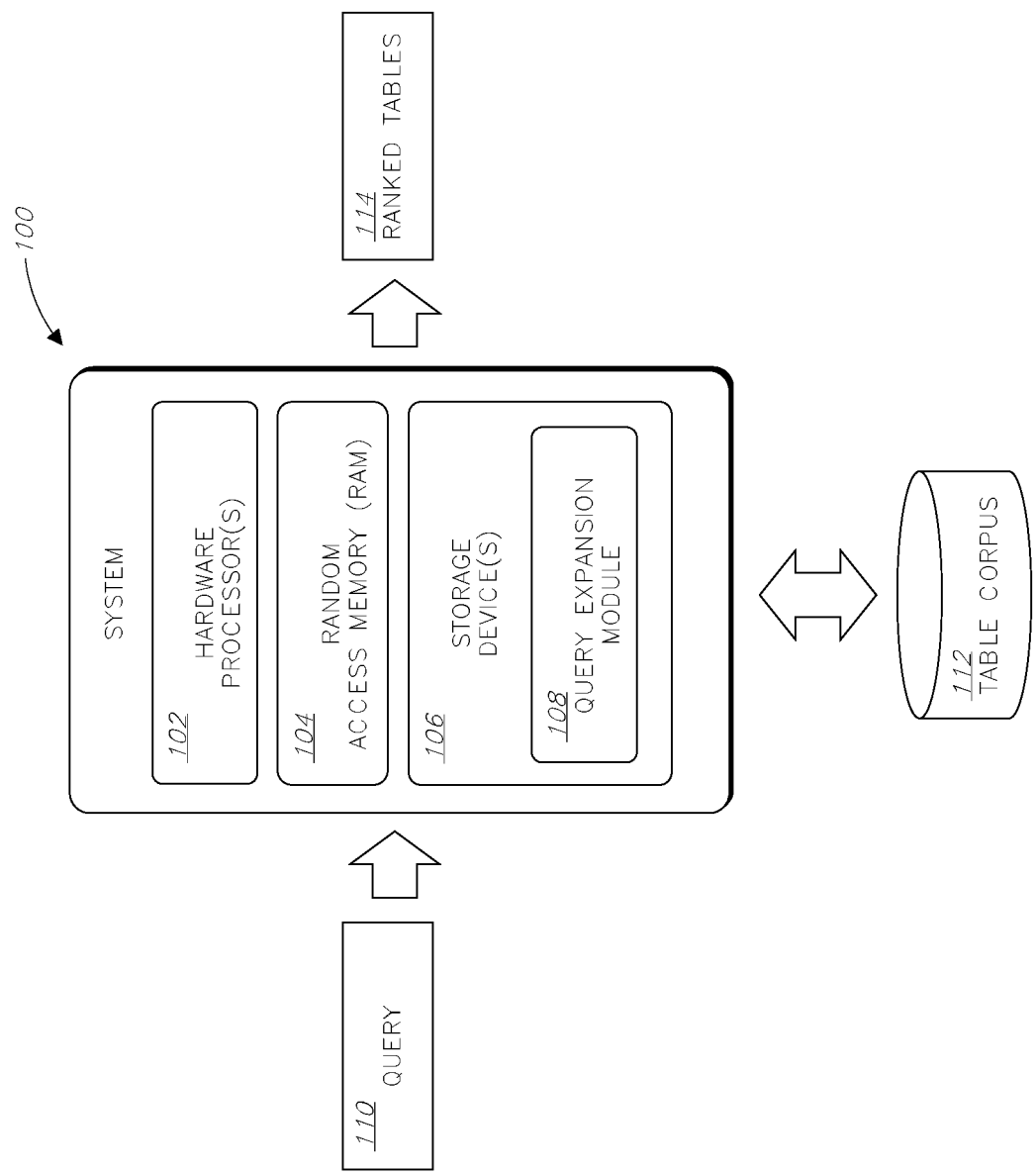
FIG. 1 shows a block diagram of an exemplary system configured for query expansion, according to an embodiment.

Reference is now made to FIG. 1, which shows a block diagram of an exemplary system 100 configured for query expansion, according to an embodiment. System 100 may also be referred to as an information retrieval system, a search engine, or the like. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a query expansion module 108. The software components may include an operating system having various software components and/or drivers for controlling and managing general system tasks (e.g., memory management, storage device control, power management, etc.), and facilitating communication between various hardware and software components.

System 100 may be configured to interface, such as over a communication network, with a table corpus 112 or an index thereof. Alternatively, the index may be stored within system 100 itself, such as in its storage device(s) 106.

System 100 may operate by loading instructions of query expansion module 108 into RAM 104 as they are being executed by processor(s) 102. The instructions of query expansion module 108 may cause system 100 to receive a query 110, retrieve tables from corpus 112, carry out processing that utilizes table columns as pseudo relevance feedback, and output a set of tables (or portions thereof) 114 ordered in accordance with ranks assigned to them by the system, or an ordered list of these tables without their contents (and instead, for example, with links to the full tables).

System 100, as described herein, is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Components of system 100 may be co-located or distributed (e.g., in a distributed computing architecture), or the system may run as one or more cloud computing "instances," "containers," "virtual machines," or the like, as known in the art.

Figure 2:
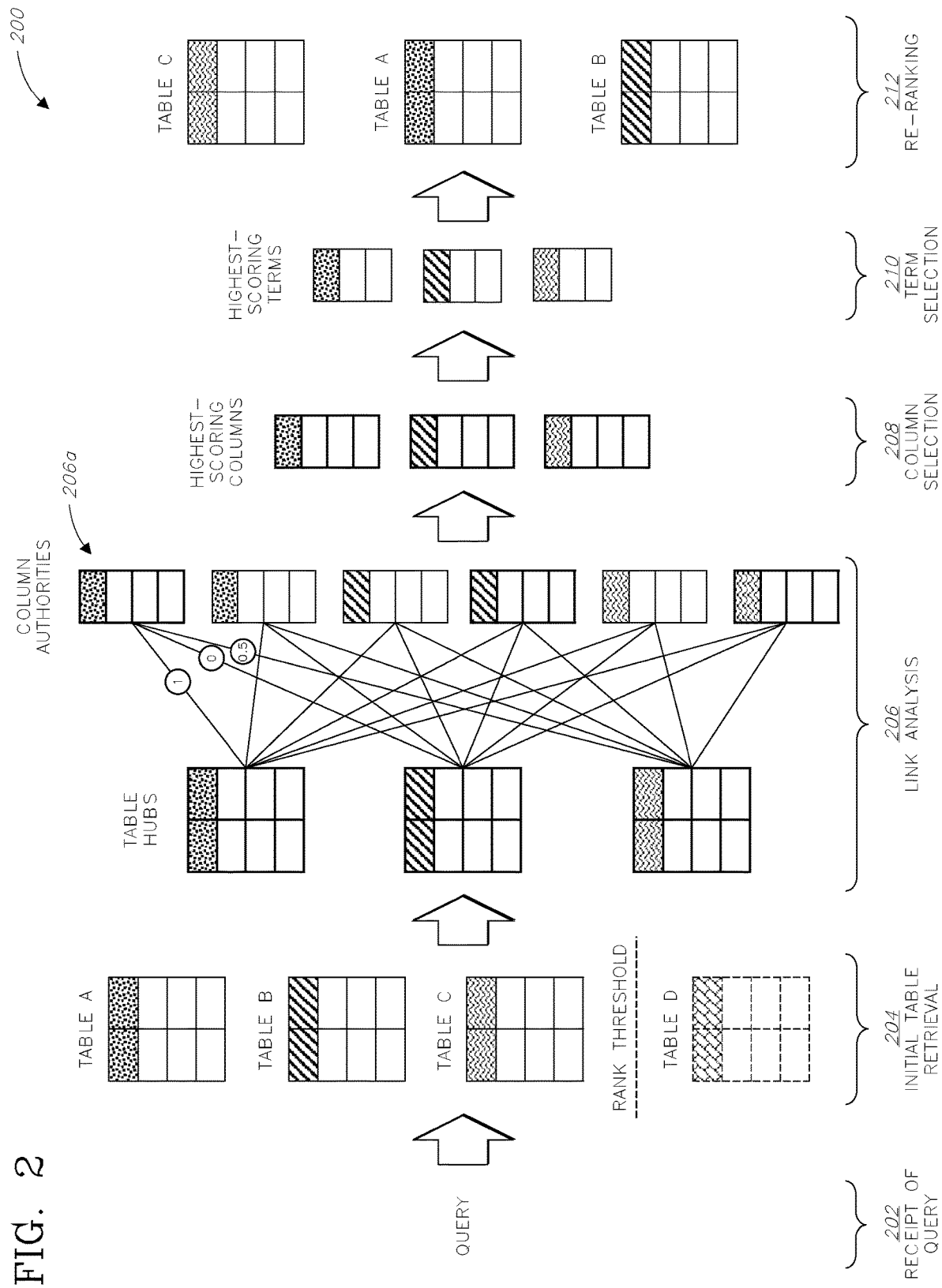
FIG. 2 shows a process diagram of an exemplary method for ad-hoc table retrieval, utilizing a query expansion technique in accordance with an embodiment.

The instructions of query expansion module 108 are now discussed with reference to the process diagram of FIG. 2, which illustrates a method 200 for ad-hoc table retrieval, in which the present technique for query expansion is utilized.

Steps of method 200, or individual actions within each step, may be performed either in the order they are presented and discussed or in a different order (or even in parallel), as long as the order allows for a necessary input to a certain step or action to be obtained from an output of an earlier step or action, as the case may be. In addition, the steps of method 200 are performed automatically (e.g., by system 100 of FIG. 1), unless specifically stated that a certain step (or a portion thereof) involves manual action of a user.

Method 200, also referred to herein as Projection-based Table Relevance Model (PTRM), may in certain aspects utilize and adapt the relevance model of V. Lavrenko and W. B. Croft, "Relevance-Based Language Models," SIGIR '01: Proceedings of the 24th Annual International ACM SIGIR conference on Research and Development in Information Retrieval, pp. 120-127 (2001). Using such a model allows to blindly expand a given user's query, with no explicit or implicit feedback from the user. Advantageously, method 200 may intelligently select certain terms contained in table columns (also referred to as table "projections") for use as pseudo relevance feedback, instead of using a language model of whole documents as the feedback as done in Lavrenko et al. The selection of these certain terms is based on the observation that not all table projections (and hence, terms contained in them) are equally relevant to a given information need. Hence, method 200 aims at finding a more fine-grained and accurate expansion to the user's original query.

In step 202, a query (q) may be received, in the form of a digitally-encoded string of one or more words, numbers, characters, and/or symbols. The query may be received from a human user who uses a client computing device to transmit the query to a server (such as system 100 of FIG. 1, or a server incorporating that system or in communication with it). Alternatively, the query may be generated by a computer system that is configured to automatically generate queries and process and/or store responses to the queries, such as a data mining system that generates queries based only on general guidance by a user.

In some scenarios, the query may be in the form of a question (e.g., "who was the US president in 1940?") or otherwise be formatted in a way which indicates that a specific piece of information is sought by the user making the query (e.g., "winner of the 2018 FIFA World Cup"). Ad-hoc table retrieval may be particularly useful in such scenarios, since in many corpora (such as the World Wide Web) the answers to such specific information needs is often found in tabular data. Method 200 may also be useful, of course, in handling queries which are formatted in a different way, such as queries not indicative of a need for a specific piece of information (e.g. "IBM," which indicates a general need for information about the company).

In step 204, a search may be executed based on the query, to retrieve a set of tables $T_q$ from a given table corpus $\mathcal{T}$, ranked according to their relevancy to the query. The search may utilize any table retrieval method (denoted $\mathcal{M}$) which is configured to evaluate relevancy of a query to tables in a corpus (or in an index of the corpus, maintained by an information retrieval system), rank tables according to their relevancy to the query, and return tables in the order of their rankings, from high to low. It may be assumed that table retrieval method $\mathcal{M}$ is able to retrieve tables which are indeed relevant to the query, but not necessarily rank them correctly. Accordingly, method 200 may be aimed at re-ranking the retrieved tables in a way which more accurately addresses the estimated information needs of the user.

Each table t in $T_q$ may include one or more columns (e.g., between 1-1000 columns)—each being a vertical array of data cells positioned below a column header, as well as one or more rows (e.g., between 1-100000 rows)—each being a horizontal array of data cells intersecting all columns. The contents of the data cells may be referred to as the "tabular data" or simply the "data" of the table, column, or row, as the case may be. Such data may include words, numbers, characters, symbols, and/or the like. Optionally, the column headers are also utilized as data cells in method 200, and are considered part of the tabular data of each table. As another option, the column headers do not participate in method 200 as data cells, but their contents are rather used as contextual information that may enhance one or more of steps 208-212 below; since column headers of tables retrieved by $\mathcal{M}$ may sometimes be more textually similar to the query than the data cells under them, such similarity may be evaluated, and then used to positively or negatively bias the column scores, term scores, and/or table re-ranking (of steps 208-212, respectively)—correspondingly to the high or low degree of similarity.

Table corpus $\mathcal{T}$ is either a corpus of just tables, or a corpus of electronic documents that occasionally contain tables (such as the World Wide Web). Such electronic documents may be HTML (HyperText Markup Language) documents and/or any other type of documents configured to contain tables, such as PDF (Portable Document Format) documents, word processing documents, etc.

The figure illustrates four retrieved tables, labeled A through D, ordered according to their ranking by table retrieval method $\mathcal{M}$, from high (Table A, the most relevant) to low (Table D, the least relevant). This is of course a simplistic example, and, in practice, the number of tables initially retrieved in step 204 may be in the tens, hundreds, or thousands of tables, or even more. Tables A-D are each shown with two columns and three rows (not counting the column headers), also merely to simplify the discussion.

Following the retrieval of tables $T_q$, the top-k tables may be selected, namely—a predefined number (k, for example between 5-50, but optionally more) of the highest-ranking tables according to table retrieval method $\mathcal{M}$. In the shown example, k is set to 3 (merely in order to simplify the discussion), causing a selection of Tables A-C (shown with thicker borders in step 206) and leaving Table D unselected. The top-k tables are denoted here $T_q^{[k]}$.

One of the key challenges in applying the relevance model to table retrieval is how to derive an informative set of columns from tables $T_q^{[k]}$, to be utilized as pseudo relevance feedback for relevance model derivation. To solve this challenge, in step 206, each column c of the aggregate of columns (denoted C) of tables $T_q^{[k]}$ may be scored using a link analysis algorithm, in a way which assigns higher scores to more informative columns, and vice versa. In the figure, column-to-table links are illustrated as edges (lines) that connect each of the six columns of Tables A-C to each of Tables A-C.

A link analysis algorithm, as known in the art, is an algorithm belonging in the field of network theory, and involves evaluation of relationships between nodes of a network, and assignment of scores (sometimes referred to as "weights") to nodes based on relationship weights. When applied to the present case, the scoring by the link analysis algorithm may be based, at least in part, on a relationship defined by calculation of content similarity between each column c and each of tables $T_q^{[k]}$; higher similarity will result in a higher content similarity score (denoted sim(t, c)), and vice versa. By way of example, if the contents of the first column of Table A (referenced as 206*a* in the figure) are very similar to the contents of Table A, intermediately similar to those of Table C, and highly dissimilar to those of Table B, these links may be assigned with content similarity scores 1, 0.5, and 0. The content similarity scores may be on any desired scale, such as from 0 to 1 or otherwise.

The content similarly score is optionally calculated using a Bhattacharyya coefficient, Term Frequency-Inverse Document Frequency (TF-IDF), Pointwise Mutual Information (PMI), or Kullback-Leibler divergence, as known in the art, or using any other suitable technique that is configured to quantify similarity of data pairs.

The calculated column-to-table similarity scores may be factored in the final score assigned in step 206 to of each column c as follows: The final score assigned to each of the columns may be a combination (e.g., averaging, multiplication, etc.), linear or non-linear, of its individual similarity scores with all pertinent tables. Returning to the previous example, the final score assigned to the first column of Table A in step 206 may be a combination of the scores 1, 0.5, and 0.

An exemplary link analysis algorithm which may be advantageous for use in step 206 is the Hyperlink-Induced Topic Search (HITS) algorithm (sometimes referred to as the Hubs and Authorities algorithm) of Jon M. Kleinberg, "Authoritative Sources in a Hyperlinked Environment," Journal of the ACM, 46(5), 604-632. Tables $T_q^{[k]}$ may be treated as "hubs" and columns C as "authorities." The key principle here is that some tables in a corpus may share similar columns. Hence, columns being linked to by better table "hubs" are considered more "authoritative," while tables linking to such columns are considered to serve as better "hubs".

The HITS algorithm may be adapted to the present case as follows: Table hub weights $\vec{H}$ may be initialized proportionally to the ranking assigned by $\mathcal{M}$ to each of these tables in step 204, denoted ranking $\mathcal{M}$ (t|q). Column authority weights $\vec{A}$, in turn, may be initialized proportionally to column normalized query likelihoods, denoted $p(c|\hat{\theta}_q)$. The HITS algorithm may then be reiterated until convergence, using the following iterative update rules that factor in column-to-table similarity:

$$\vec{A}(c) \stackrel{\text{def}}{=} \Sigma_t \text{sim}(t,c) \vec{H}(t), \text{ and}$$

$$\vec{H}(t) \stackrel{\text{def}}{=} \Sigma_c \text{sim}(t,c) \vec{A}(c),$$

where sim(t, c), if calculated using a Bhattacharyya coefficient, may be defined here as:

$$sim(t, c) \stackrel{\text{def}}{=} \sum_w \sqrt{p(w|\hat{\theta}_t) \times p(w|\hat{\theta}_c)}.$$

The final scores assigned to columns C in step 206 may be based on their respective column authority weights $\vec{A}$ upon convergence of the HITS algorithm. For example, each of these weights may be used as-is as a final score, or be multiplied by a uniform coefficient to produce the final score.

In step 208, the top-m columns may be selected, namely—a predefined number (m, for example between 5-100, but optionally more) of the highest-scoring columns of step 206. In the shown example, m is set to 3 (merely in order to simplify the discussion), causing a selection of the three columns shown with thicker borders in step 206 and subsequently in step 208. These three columns are shown as selected, respectively, from Tables A-C; however, this is merely for purposes of illustration, and in practice the top-m columns may originate from any of tables $T_q^{[k]}$ whatsoever.

However, the contents of these highest-scoring columns may still not be focused enough to serve as pseudo relevance feedback. While some terms contained in these columns may indeed be highly-relevant to the query, others may be of little or no relevancy, which may consequently degrade the results of the re-ranking in step 212 (discussed below).

Accordingly, in step 210, the top-m columns may undergo further focusing, by scoring each term contained in them (e.g., one or more words in natural language, one or more numbers, one or more symbols, one or more characters, or any combination of the foregoing) according to its similarity to the query. The similarity may be calculated, for example, using a technique such as Term Frequency-Inverse Document Frequency (TF-IDF), Pointwise Mutual Information (PMI), Kullback-Leibler divergence, or Bhattacharyya coefficient, as known in the art. The calculated term scores may be on any desired scale, such as from 0 to 1 or otherwise.

The top-n terms, namely—a predefined number (n, for example between 1-10, but optionally more) of the highest-scoring terms in each of the top-m columns, may then be selected as pseudo relevance feedback, to expand the query. In other words, each of the top-m columns may be pruned, removing all but the top-n terms, thereby making these columns focused, informative, and ready to serve as the pseudo relevance feedback.

In step 212, tables $T_q^{[k]}$ may be re-ranked by using the pruned columns (namely, the top-n terms of each of the top-m columns) as pseudo relevance feedback which expands the query. Formally expressed, the pruned columns may be denoted C', and each table t in $T_q^{[k]}$ may be re-ranked (scored) as follows:

$$\text{score}(t|C') \stackrel{\text{def}}{=} \Sigma_{c \in C'} CE(c|t) \times CE(q|c),$$

where CE(x|y) is the cross-entropy when using text x as the query and y as the document.

Then, the re-ranked tables may be provided as a response to the query received in step 202, ordered according to the re-ranking. In the shown example, the re-ranking of Tables A-C resulted in Table C receiving the highest score, followed by Table A, and lastly Table B. These tables may be provided to the user in that order—C, A, B.

Additionally or alternatively, the response to the query may include just a portion of each of the re-ranked tables, or data contained in at least one of these tables. As one example, if the query indicates that a specific piece of information is sought by the user (e.g., "winner of the 2018 FIFA World Cup"), then specific data from at least one of the re-ranked tables may be selected and provided (e.g., "France"); this may be based on calculating which term from these tables is most probably the specific piece of information sought, such as the most frequent term (or stem) appearing in the tables.

As another example, if a table includes a relatively large number of rows and/or columns, which might make its display on a computer monitor cumbersome, that table may be truncated (by removing some rows and/or columns) to make it more convenient to view. A link to the full, non-truncated view of that table may optionally be generated and displayed next to it.

In conclusion, method 200 may provide relevant, ordered, tables (or partial data from these tables) in response to a query, by leveraging certain data contained in table columns as pseudo relevance feedback.

Method 200 may be rapidly executed upon each received query, so that the response is transmitted back to the user in near real-time with the receipt of the query (optionally within 0.1 seconds, 0.5 seconds, 3 seconds, 6 seconds, or 10 seconds of the receipt of the query).

Experimental Results

The present query expansion technique was tested in an ad-hoc table retrieval task against various state-of-the-art table retrieval methods, to evaluate its contribution to retrieval quality.

The testing was performed using the WikiTables benchmark, which includes a pool of 60 ad-hoc queries, approximately 1.6 million tables extracted from Wikipedia, and manual labels of each table's ground-truth relevancy to each query, on a grading scale of {0, 1, 2} (irrelevant, somewhat relevant, and highly-relevant, respectively). See S. Zhang and K. Balog, "Ad Hoc Table Retrieval using Semantic Similarity," in Proceedings of the 2018 World Wide Web Conference, WWW '18, pp. 1553-1562 (2018).

To obtain the initial list of tables $T_q^{[k]}$ (with k=20 for experimental purposes) for re-ranking using the present technique, three state-of-the-art, baseline table retrieval methods were comparatively used: STR, T2V, and TablE-Sim.

STR is a semantically rich learning-to-rank method which uses 34 different query and table features, proposed by Zhang (2018), referenced above.

T2V is a learning-to-rank method that utilizes domain specific table embeddings, proposed by L. Zhang, S. Zhang, and K. Balog, "Table2Vec: Neural Word and Entity Embeddings for Table Population and Retrieval," in Proceedings of the 42$^{nd}$ International ACM SIGIR Conference on Research and Development in Information Retrieval, SIGIR '19, pp. 1029-1032 (2019).

TablESim is a method utilizing passage-based and manifold-based table similarities, proposed by R. Shraga, H. Roitman, G. Feigenblat, and M. Canim, "Ad Hoc Table Retrieval Using Intrinsic And Extrinsic Similarities," in Proceedings of the 2020 World Wide Web Conference, WWW '20, pp. 2479-2485 (2020).

The re-ranking by the present technique was compared against re-ranking using the state-of-the-art RM3 relevance model of Lavrenko (2001), which is derived from tables as a whole (i.e., using each table's entire contents) rather than only from their projections.

Following Shraga (2020), Zhang (2019), and Zhang (2018), the present technique and RM3 were evaluated using a 5-fold cross validation approach, reporting average performance over test folds. Following Zhang (2019) and Zhang (2018), table retrieval quality was measured using the Normalized Discounted Gain (NDCG) measure at cutoffs k∈{5,10,20} (abbreviated N@5, N@10 and N@20, respectively). Following Shraga (2020), Precision (P@5 and P@10) and Mean Average Precision (MAP), which are common measures in re-ranking tasks, were also measured.

Experimental results are presented in Table 1, in which the present technique is abbreviated "PTRM." These results were obtained with m tuned to 5 and n tuned to 20. However, experimentation was also made with other values for these two parameters, such as m∈[3, 20] and n∈[3, 20], obtaining similar results. It is also believed that exceeding these ranges upwards can achieve beneficial results in various scenarios.

As can be seen in Table 1, among the three baseline retrieval methods, the performance of TablESim as a stand-alone table retrieval method was the highest. In the majority of cases, re-ranking the tables (initially retrieved by the three baseline methods) using either one of the two relevance models, RM3 or the present technique, resulted in a further performance gain. For example, compared to TablESim, the best-performing baseline method of the three, re-ranking its tables using the present technique has resulted in +6% and +5% improvement in P@5 and N@5, respectively.

Notably, however, the re-ranking by the present technique was superior to that of RM3 across most baseline methods and quality measures, yielding up to 4% better results, depending on the measure.

These empirical results establish the improvement made by the present technique to the technological field of computerized information retrieval, and more specifically to computerized table retrieval.

TABLE 1

Experimental results.

| Method | P@5 | P@10 | N@5 | N@10 | N@20 | MAP |
|---|---|---|---|---|---|---|
| STR | 58.33 | 53.67 | 59.51 | 62.93 | 68.25 | 51.41 |
| STR + RM3 | 60.33 | 52.83 | 61.64 | 64.16 | 69.85 | <u>53.42</u> |
| STR + PTRM | 61.00 | <u>54.50</u> | 61.76 | 64.32 | 69.05 | 52.59 |
| T2V | 56.67 | 50.67 | 59.74 | 60.96 | 65.05 | 46.75 |
| T2V + RM3 | 58.00 | 50.17 | 59.79 | 59.92 | 64.30 | 46.28 |
| T2V + PTRM | 57.33 | 50.67 | 59.89 | 60.30 | 64.58 | 47.14 |
| TablESim | 58.67 | 50.67 | 63.31 | 64.01 | 68.62 | 50.85 |
| TablESim + RM3 | 59.78 | 51.35 | 64.52 | 64.79 | 68.78 | 50.54 |
| TablESim + PTRM | <u>62.33</u> | 53.00 | <u>66.54</u> | <u>66.57</u> | <u>70.04</u> | 52.59 |

Values in boldface denote the best result per baseline retrieval method.
Underlined values denote the overall best result per quality measure.

The specific implementation of the present technique, as described above in connection with the tests made, is considered an optional embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising, in a computerized information retrieval system, the following automatic steps:
   receiving a query;
   executing a search based on the query, to retrieve a set of tables ranked according to their relevancy to the query, wherein each of the tables includes one or more columns;
   selecting, from the set of tables, a predefined number of highest-ranking tables;
   calculating content similarity between each of the highest-ranking tables and each of the columns of the highest-ranking tables;
   scoring each column in the highest-ranking tables using the Hyperlink-Induced Topic Search (HITS) algorithm, and selecting, from the scored columns, a predefined number of highest-scoring columns,
      wherein, in the scoring of the columns of the highest-ranking tables:
         the highest-ranking tables are represented as hubs,
         the columns of the highest-ranking tables are represented as authorities,
         hub weights and authority weights are iteratively updated while factoring in the calculated content similarities, and
         the scoring of the columns of the highest-ranking tables is based on the authority weights upon convergence of the HITS algorithm;
   scoring terms contained within each of the highest-scoring columns, and selecting, from the scored terms, a predefined number of highest-scoring terms,
      wherein the scoring of the terms comprises scoring each of the terms according to its similarity to the query, and wherein the similarity of each of the terms to the query is evaluated using a technique selected from the group consisting of: Bhattacharyya coefficient, Term Frequency-Inverse Document Frequency (TF-IDF), Pointwise Mutual Information (PMI), and Kullback-Leibler divergence;

re-ranking the highest-ranking tables by using the highest-scoring terms as pseudo relevance feedback that expands the query; and providing, as a response to the query, at least one of:
(a) the re-ranked tables, ordered according to the re-ranking, and
(b) data contained in at least one of the re-ranked tables, wherein the data are ordered according to the re-ranking.

2. The method of claim 1, wherein the re-ranking is based on:
cross-entropy between each of at least some of the terms and each of the highest-ranking tables; and
cross-entropy between each of at least some of the terms and the query.

3. A system comprising:
(a) at least one hardware processor; and
(b) a non-transitory computer-readable storage medium having program code embodied therewith, the program code executable by said at least one hardware processor to, automatically:
receive a query,
execute a search based on the query, to retrieve a set of tables ranked according to their relevancy to the query, wherein each of the tables includes one or more columns,
calculating content similarity between each of the highest-ranking tables and each of the columns of the highest-ranking tables;
select, from the set of tables, a predefined number of highest-ranking tables,
score each column in the highest-ranking tables using the Hyperlink-Induced Topic Search (HITS) algorithm, and select, from the scored columns, a predefined number of highest-scoring columns,
wherein, in the scoring of the columns of the highest-ranking tables;
the highest-ranking tables are represented as hubs,
the columns of the highest-ranking tables are represented as authorities,
hub weights and authority weights are iteratively updated while factoring in the calculated content similarities, and
the scoring of the columns of the highest-ranking tables is based on the authority weights upon convergence of the HITS algorithm;
score terms contained within each of the highest-scoring columns, and selecting, from the scored terms, a predefined number of highest-scoring terms,
wherein the scoring of the terms comprises scoring each of the terms according to its similarity to the query, and wherein the similarity of each of the terms to the query is evaluated using a technique selected from the group consisting of: Bhattacharyya coefficient, Term Frequency-Inverse Document Frequency (TF-IDF), Pointwise Mutual Information (PMI), and Kullback-Leibler divergence;
re-rank the highest-ranking tables by using the highest-scoring terms as pseudo relevance feedback that expands the query, and
provide, as a response to the query, at least one of:
(i) the re-ranked tables, ordered according to the re-ranking, and
(ii) data contained in at least one of the re-ranked tables, wherein the data are ordered according to the re-ranking.

4. The system of claim 3, wherein the re-ranking is based on:
cross-entropy between each of at least some of the terms and each of the highest-ranking tables; and
cross-entropy between each of at least some of the terms and the query.

5. A computer program product comprising a non-transitory computer-readable storage medium having program code embodied therewith, the program code executable by at least one hardware processor to, automatically:
receive a query;
execute a search based on the query, to retrieve a set of tables ranked according to their relevancy to the query, wherein each of the tables includes one or more columns;
select, from the set of tables, a predefined number of highest-ranking tables;
calculate content similarity between each of the highest-ranking tables and each of the columns of the highest-ranking tables;
score each column in the highest-ranking tables using the Hyperlink-Induced Topic Search (HITS) algorithm, and selecte, from the scored columns, a predefined number of highest-scoring columns,
wherein, in the scoring of the columns of the highest-ranking tables;
the highest-ranking tables are represented as hubs,
the columns of the highest-ranking tables are represented as authorities,
hub weights and authority weights are iteratively updated while factoring in the calculated content similarities, and
the scoring of the columns of the highest-ranking tables is based on the authority weights upon convergence of the HITS algorithm;
score terms contained within each of the highest-scoring columns, and select, from the scored terms, a predefined number of highest-scoring terms,
wherein the scoring of the terms comprises scoring each of the terms according to its similarity to the query, and wherein the similarity of each of the terms to the query is evaluated using a technique selected from the group consisting of: Bhattacharyya coefficient, Term Frequency-Inverse Document Frequency (TF-IDF), Pointwise Mutual Information (PMI), and Kullback-Leibler divergence;
re-rank the highest-ranking tables by using the highest-scoring terms as pseudo relevance feedback that expands the query; and
provide, as a response to the query, at least one of:
(a) the re-ranked tables, ordered according to the re-ranking, and
(b) data contained in at least one of the re-ranked tables, wherein the data are ordered according to the re-ranking.

6. The computer program product of claim 5, wherein the re-ranking is based on:
cross-entropy between each of at least some of the terms and each of the highest-ranking tables; and
cross-entropy between each of at least some of the terms and the query.

* * * * *